F. HICKMAN.
Coffee Mill.
No. 230,279.     Patented July 20, 1880.
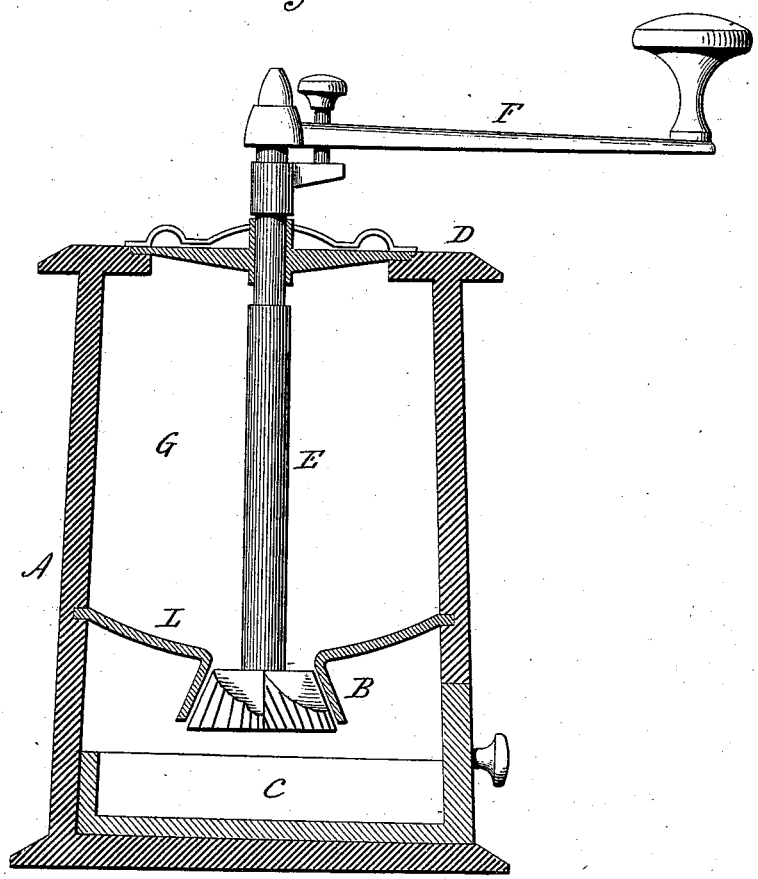
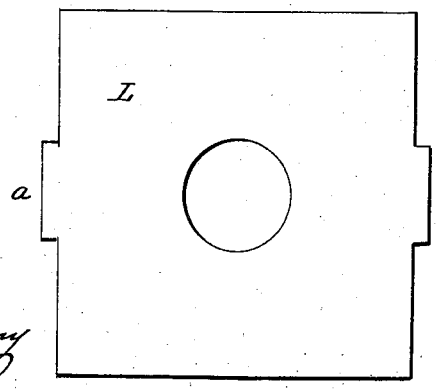

UNITED STATES PATENT OFFICE.

FRANCIS HICKMAN, OF READING, PENNSYLVANIA, ASSIGNOR TO THE CHARLES PARKER COMPANY, OF MERIDEN, CONNECTICUT.

COFFEE-MILL.

SPECIFICATION forming part of Letters Patent No. 230,279, dated July 20, 1880.

Application filed October 26, 1878.

*To all whom it may concern:*

Be it known that I, FRANCIS HICKMAN, of Reading, in the county of Berks and State of Pennsylvania, have invented a new Improvement in Coffee-Mills; and I do hereby declare the following, when taken in connection with the accompanying drawings and the letters of reference marked thereon, to be a full, clear, and exact description of the same, and which said drawings constitute part of this specification, and represent, in—

Figure 1, vertical central section; Fig. 2, top view of the bottom of the hopper.

This invention relates to an improvement in that class of coffee-mills in which the runner is arranged to be worked by a vertical spindle and horizontal crank, and particularly to that class of box-mills in which the runner is suspended below the top; and it consists in the construction, as hereinafter described, and more particularly recited in the claim.

A is the box; B, the runner-shell; C, the receiver below; D, the top of the box; E, the runner-shaft, and F the crank.

The box is made considerably higher than the ordinary box-mill in order to form a large receiving-chamber, G, so that a considerable amount of coffee may be placed in this chamber and ground from time to time, as required, this chamber forming a holder for the unground coffee. An aperture is made through the top, closed by a suitable cover, for the purpose of introducing coffee or material to be ground.

The runner-shell B is attached to or made a part of the hopper or bottom L. This bottom or hopper is shown detached in Fig. 2. It is constructed of a size sufficient to form a partition in the box or bottom of the chamber G, and provided on its edge with lugs $a$. In the sides of the box grooves are made to receive these lugs, and so that the hopper L may be introduced into the said grooves when putting the box together, and so that when the box is secured together the hopper is immovably held therein without other fastening than that which the hopper itself provides.

While lugs or projections on the edge of the hopper are preferred, it will be understood that the hopper may be made a little larger than the internal dimensions of the box, and so that it will extend into the grooves in the sides of the box.

I am aware that coffee-mills have been constructed with a closed chamber above and receiver below the hopper, and therefore do not broadly claim such construction.

I claim—

A box coffee-mill having the box constructed to form a receiving-chamber in the upper part and a receptacle for the ground coffee in the lower part, with the hopper and grinding mechanism arranged as a partition between the said two parts of the box, and supported in grooves in the side of the box, substantially as described.

FRANCIS HICKMAN.

Witnesses:
JAMES R. KENNEY,
J. H. JACOBS.